United States Patent [19]

Elversson

[11] Patent Number: 5,901,871
[45] Date of Patent: May 11, 1999

[54] BOX FOR STORING AND SIMULTANEOUSLY EXPOSING SMALL GOODS

[76] Inventor: Tord Elversson, Akergatan 19, Edsbyn, Sweden, S-828 31

[21] Appl. No.: 08/983,122

[22] PCT Filed: Jul. 3, 1996

[86] PCT No.: PCT/SE96/00894

§ 371 Date: Jan. 27, 1998

§ 102(e) Date: Jan. 27, 1998

[87] PCT Pub. No.: WO97/01976

PCT Pub. Date: Jan. 23, 1997

[30] Foreign Application Priority Data

Jul. 6, 1995 [SE] Sweden .................................. 9502451
Dec. 27, 1995 [SE] Sweden .................................. 9504657

[51] Int. Cl.⁶ ........................................................ B65G 1/00
[52] U.S. Cl. ...................... 220/495.01; 220/1.5; 220/600
[58] Field of Search ............................. 220/495.01, 600, 220/625, 1.5, 559

[56] References Cited

U.S. PATENT DOCUMENTS 2,159,262  5/1939  Feiss ...................................... 220/559
2,812,104  11/1957  Larsen .
3,269,589  8/1966  Orser .
5,823,381  10/1998  Ashley et al. .......................... 220/559

FOREIGN PATENT DOCUMENTS 344935  8/1978  Austria .
1543616  10/1968  France .
24335  8/1912  Norway .

Primary Examiner—Steven Pollard
Attorney, Agent, or Firm—Young & Thompson

[57] ABSTRACT

A box for storing and simultaneously exposing small goods comprises a wall shell (3) opening upwards composed of a number of upright walls (4, 5) and a plate (7) being vertically adjustable between upper and lower end positions to support the goods. A second, inner wall shell (9) is arranged at a distance inside said wall shell (3) said second wall shell (9) presenting upper, supporting edge portions located in the area of the top opening (29) of the outer wall shell (3). Fabrics (21) are arranged for lifting and level-keeping of the supporting plate (7), each of which fabric being laid over an upper edge portion of the inner wall shell (9) and has a first part extending between said edge portion and the supporting plate as well as a second part extending between the edge portion and a driving mechanism in the form of a roll (20) in relation to which the fabric may be fed in and out respectively.

10 Claims, 6 Drawing Sheets

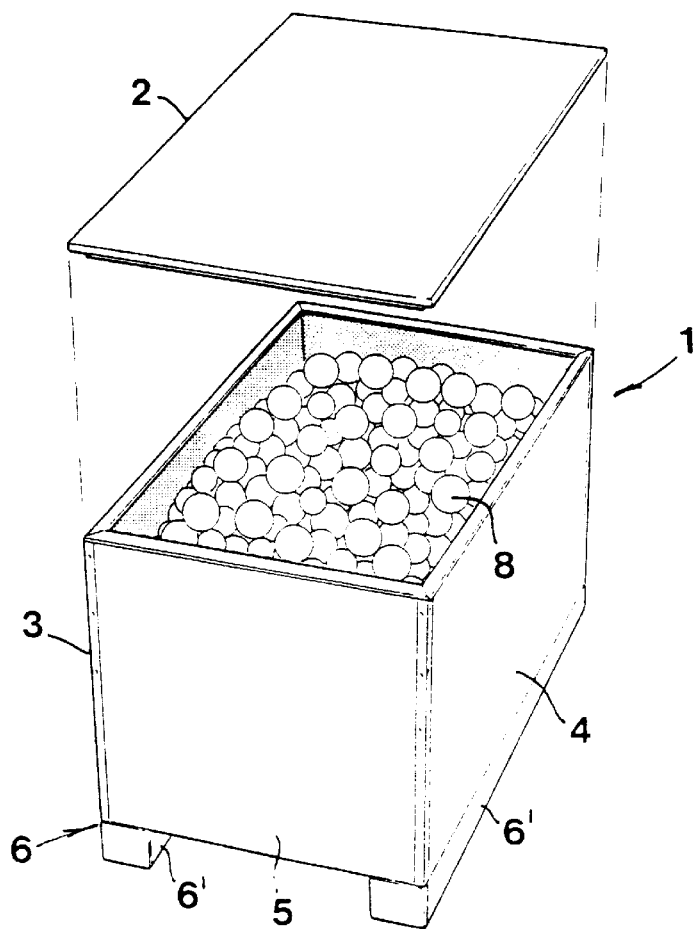
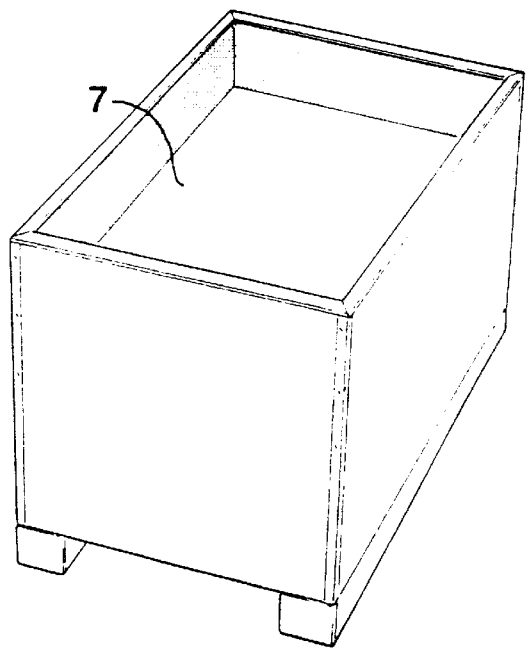
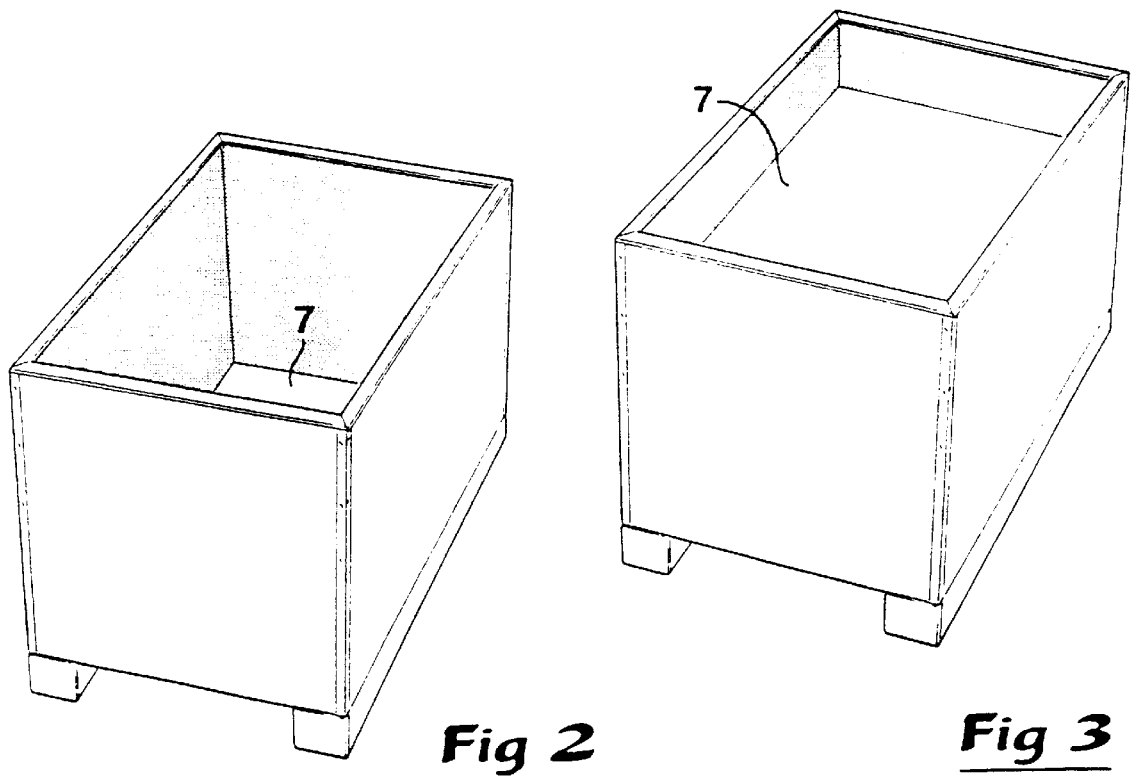
Fig 1
Fig 2
Fig 3

5,901,871

BOX FOR STORING AND SIMULTANEOUSLY EXPOSING SMALL GOODS

TECHNICAL FIELD OF THE INVENTION

This invention relates to a box for storing and simultaneous exposing small goods, said box comprising a wall shell which opens upwards in a top opening and is composed of a number of upright walls extending upwards from a bottom frame, and a goods-supporting plate being vertically adjustable between upper and lower end positions relative to the wall shell.

BACKGROUND OF THE INVENTION AND PRIOR ART

So called pallet boxes are used within a number of areas for storing small goods or mass articles of different kinds. One field of use is to be found in manufacturing industries, where various components are stored in pallet boxes either after having been produced in the industry in question or before mounting as integrated units in larger products. In everyday consumer goods retail trade, pallet boxes are used for storing sales objects in an exposed state. In this case, the customer may, after removal of a covering lid, pick the objects directly from the box, meaning that the staff of the sales company does not need to spend costly time to put up the objects on special shelves or racks.

Irrespective of the field of use, pallet boxes are in many respects advantageous as containers for storing mass articles. An advantage is that they are of a good volume (in practice within the range of ½–2 m³) which admits the storing of large quantities of goods. Another advantage is that they may be lifted and transported by means of motor-driven fork trucks as well as manually driven pallet lifters of a more simple nature. However, a disadvantage of known pallet boxes is that the goods-supporting bottom plate of the box is fixed or immovably connected to the wall shell. This implies that the level of the goods—from lying in flush with the top opening of the box in the initially filled box—sinks as the goods is consumed and the box emptied. Since the wall shell has a considerable height—usually about 1 m—increasing difficulties to reach the individual objects occur successively. In consumer goods retail trade, the result of this will be that the sales frequency is radically deteriorated so as to go towards nought before the box is completely emptied. Therefore, to maintain good sales, the box has to be filled with more goods or, alternatively, the semi-emptied box in its entirety is to be replaced by a filled box. When pallet boxes are used in the manufacturing industry for storing part components which are to be mounted by an operator, the sinking level of goods implies that the operator is forced to bend, in an ergonomically inappropriate way, deeper and deeper down over the walls of the box to reach down to the components.

The problem with deteriorated sales as a consequence of a sinking level of goods in storing boxes has been observed in NO 24335, which discloses a box of the kind initially generally referred to, more precisely in the form of a smaller metal box for storing and simultaneously exposing such small food articles as cookies, biscuits, sweets and the like. In order to solve the problem, this box is equipped with a goods-supporting metal sheet which can be manually lifted up to higher and higher levels relative to the surrounding wall shell as the contents of the box is consumed. The lifting is done by means of two metal lugs protruding through elongate holes in opposite walls in the wall shell and which lugs have projections by means of which the supporting sheet may be locked in a desired level of position in relation to the wall shell.

The solution of the problem known through NO 24335 may perhaps be realized for those boxes having a limited volume and which accordingly may take up goods the total weight of which is moderate. However, the solution of the problem is not applicable to pallet boxes, the volume of which may attain 1 m³ or more and which may contain goods having a total weight of many hundreds of kilos.

OBJECTS AND FEATURES OF THE INVENTION

A primary object of the present invention is to create a box of the kind initially referred to, which may receive goods of a considerable total weight at the same time as the vertically adjustable bottom plate—despite the heavy contents of the box—may be moved in a simple and flexible way between different position levels inside the wall shell as the quantity of the goods is changed. Another object is to create a box which may be made as a pallet box the exterior of which do not differ in an evident way from conventional pallet boxes in spite of the possibility to raise or lower the supporting plate. An important object is furthermore to create a box in which the movable supporting plate may be lifted and lowered respectively without running the risk of the articles stored in the box being scratched or in another way damaged by coming in friction contact with the surrounding wall shell.

According to the invention, at least the primary object is attained by the features defined in the characterising clause of claim 1. Preferred embodiments of the invention are furthermore defined in the dependent claims.

FURTHER ELUCIDATION OF PRIOR ART

A mobile box for storing milk packs in a heat-insulated condition is previously known through U.S. Pat. No. 3,269,589. A vertically movable trough on which milk crates may be loaded is arranged in the box. However, this box is not suitable for rush-storing mass articles but presupposes that the articles are piled in crates. In addition to this, the mechanism for lifting and lowering the goods-supporting trough is extremely complicated and costly.

BRIEF DESCRIPTION OF THE APPENDED DRAWINGS

In the drawings:

FIG. 1 is a perspective exploded view showing a first embodiment of the box according to the invention together with the appurtenant lid, FIG. 2 is a perspective view showing only the box itself, more precisely with the supporting plate in a lower end position, FIG. 3 is a corresponding perspective view showing the supporting plate in the area of an upper end position, FIG. 4 is a perspective exploded view showing an outer wall shell included in the box separated from an inner wall shell, FIG. 5 is an enlarged detail section in the area of the upper edges of the outer and the inner wall shells, FIG. 6 is an enlarged detail section showing a fabric included in the box, said fabric being winded up on a roll, FIG. 7 is a perspective view showing two foldable boxes according to an alternative embodiment, the boxes being piled on each other in a position when four wall units are folded down relative to the bottom frame, FIG. 8 is a perspective view showing a box with the supporting plate lowered to the bottom of the box, FIG. 9 is a partially cut longitudinal section showing the wall units in a folded down position, FIG. 10 is a partly cut perspective view illustrating the fabrics included in the box which guarantee lifting and lowering of the supporting plate, FIG. 11 is four cross sections through as many wall units included in the box according to FIG. 10, FIG. 12 is a side view of an individual wall unit, FIG. 13 is a partly cut end view illustrating parts of a gable wall unit of the box according to FIG. 10, FIG. 14 is a perspective view of another alternative embodiment of the box according to the invention, and FIG. 15 is a partial end view of the box according to FIG. 14.

DETAILED DESCRIPTION OF PREFERRED EMBODIMENTS OF THE INVENTION

Figure 4:
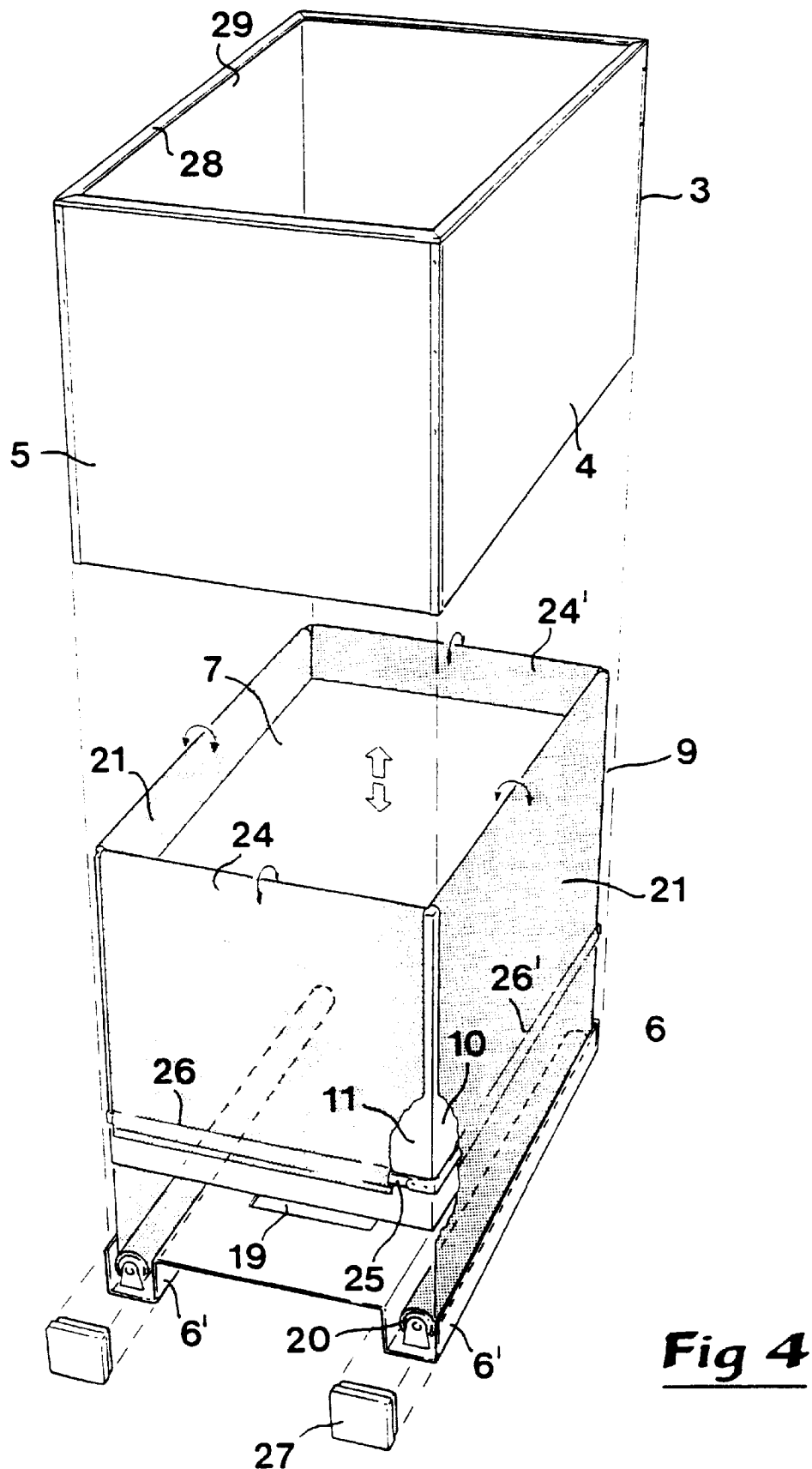

In FIG. 1 reference numeral 1 generally designates a box made according to the invention on which a lid 2 may be put. The box has a parallelepipedical basic shape and comprises an outer wall shell 3 composed of four upright walls 4, 5 of which the first-mentioned ones form long side walls and the last-mentioned ones gable walls. The wall shell 3 as well as the lid 2 may in practice advantageously be made of plywood plates which, in a conventional way, are provided with fittings of bended metal sheet. The box 1 may have of a length in the range of 100–200 cm, a width in the range of 60–80 cm and a height of about 1 meter. Thus, the volume of the box may be in the range of 0,6–1 $m^3$. A bottom frame 6, having a pair of separated supporting elements 6' in association with the long side walls 4, is also included in the box. The fork arms of a fork truck or a pallet lifter may be inserted between said supporting elements.

A vertically movable supporting plate 7, which is shown in a lower end position in FIG. 2 and in the area of an upper end position in FIG. 3, is included in the box. The plate 7 supports small goods or mass articles which in FIG. 1 are schematically illustrated in the form of balls 8.

Figure 5:
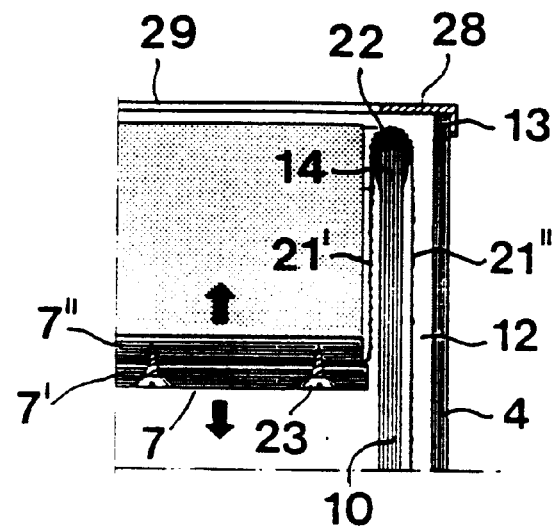
Figure 6:
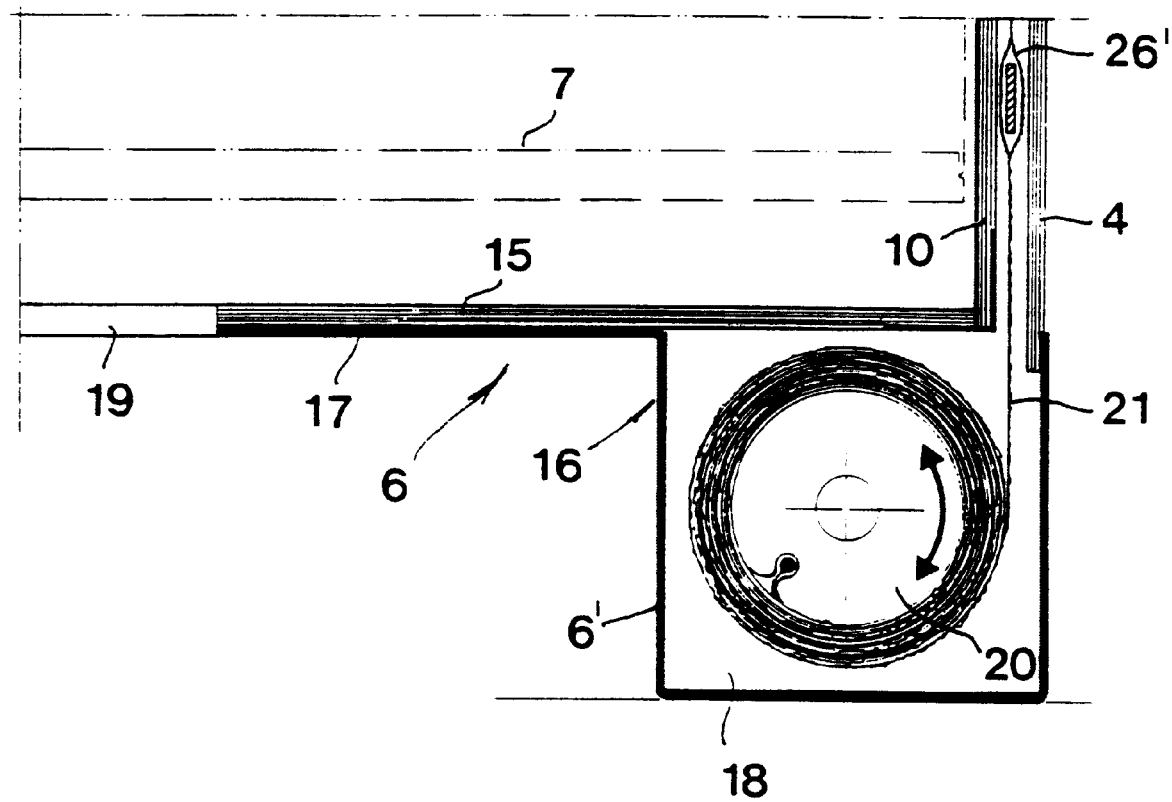

Reference is now made to FIGS. 4 to 6 illustrating how the box 1, apart from the outer wall shell 3, includes a second, inner wall shell 9. The inner wall shell 9 includes, like the outer wall shell 3, four upright walls, viz., two long side walls 10 and two gable walls 11. The walls 10, 11 are somewhat shorter than the corresponding walls in the outer shell, whereby a gap 12 (see FIG. 5) is formed between each outer wall and the corresponding inner wall. Furthermore, the individual inner wall has a somewhat lower height than the corresponding outer wall, whereby the upper edge 13 of the outer wall is located on a somewhat higher level than the upper edge 14 of the inner wall. All four inner walls 10, 11 are connected to a fixed bottom plate 15 included in the bottom frame 6. In practice, the walls 10, 11 as well as the bottom plate 15 may be made of plywood plates. These together form a stiff inner frame.

A bottom portion in the form of a bended plate or metal sheet 16 which, besides a plane centre portion 17, has cross-section-wise U-shaped portions forming the above-mentioned supporting element 6', is applied on the underside of the bottom plate 15. The U-portions 6' delimit channel-like cavities 18, which are open towards the gap 12 between the wall shells 3 and 9. As is evident from FIG. 4 and 6, there is recessed a common hole 19 of a considerable size in the bottom plate 15 as well as in the centre portion 17 of the plate 16.

A rotatably mounted roll 20 is placed in each one of the cavities 18 of the two supporting elements 6' inside of which roll at least one electric motor 15 (not shown) is mounted in a known way per se, by means of which motor the roll may be driven. Motor driven rolls of this kind is commercially available for awning arrangements and the like. As is evident from FIG. 5 and 6, a fabric, in its entirety designated 21, is rolled outside the individual driving roll 20, which fabric is laid over the upper edge portion 14 of the long side wall 10 of the inner wall shell. The upper edge portion 14 divides the fabric 21 in two vertical parts 21', 21". A sliding border 22 of plastics, e.g. NYLON or the like, may be applied on the upper edge of the wall 10 in order to reduce the friction between the fabric and said wall. The internal fabric part 21' supports, at the free end thereof, the supporting plate 7. As is evident from FIG. 5, the supporting plate 7 may be composed of two part plates 7', 7" which are interconnected by means of screws 23. Advantageously, the fabric 21 is connected to the supporting plate by being squeezed in between the part plates 7' and 7". In practice, one single continuous fabric may be drawn between the two driving rolls (see FIG. 4) of the box. Thus, this continuous fabric extends unbroken from one of the driving rolls over the upper edge of the appurtenant inner wall 10 and the whole way between the two part plates 7', 7" so as to be drawn, at the opposite long side of the box, over the upper edge of the long side wall and down to the appurtenant driving roll. It should be particularly noted that the width of the fabric 21 in all essentials corresponds with the length of the long side walls 10 included in the inner wall shell 9.

Fabrics 24, 24' are also laid over the gable walls 11 of the inner wall shell (also the fabrics 24, 24' may constitute parts of a continuous fabric path which is squeezed in between the part plats 7', 7"). The fabrics 24, 24' are connected, at the free ends thereof, to a continuous frame 25 arranged around the outside of the inner wall shell. More precisely, the short side pieces of the frame are inserted into pockets 26 in the area of the free end portions 24, 24' of the fabrics. In a corresponding way, the long side pieces of the frame are sewed in pockets 26' in the fabric or the fabrics 21. This means that the frame 25 servilely follows the movements of the fabric parts 21 decided by the driving rolls 20 along the long side walls.

The channels 18 in the supporting elements 6' formed by the U-bended plate 16 are closable by means of separate covering plates 27 (see FIG. 4). An edge border 28 is mounted on the upper edge portion of the outer wall shell 3. The width of the horizontal flange of the border 28 is at least so great that it covers the gap 12 between the two wall shells. The border 28 lies on a level with the top opening of the box which in FIG. 5 is designated 29.

THE FUNCTION OF THE BOX ACCORDING TO THE INVENTION

Presuming that the box is used for sales of the stored articles 8, the box is delivered to the sales company in question in a filled state in which the supporting plate 7 assumes the lower end position thereof according to FIG. 2. After removal of the lid 2, the articles 8 may be picked directly from the box by the customer, i.e. without the staff of the sales company first having to distribute the articles to shelves and racks. After a certain time of consumption, the upper level of the contents of the box will sink. When that has happened, the motors included in the rolls 20 are activated, the rolls being brought into rotation. This entails that the actively lifting fabrics 21 along the long side walls of the box are stretched, the internal fabric part 21' being shortened at the same time as the external part 21" is winded up on the roll 20. This results in the supporting plate 7 being lifted. By a suitably adjusted driving of the motors of the roll 20, the lifting of the supporting plate 7 may be matched so that the upper level for the contents of articles 8 is located approximately in flush with the top opening 29 of the box. The appurtenant frame 25 guarantees that also the fabrics 24, 24' along the gable walls are properly stretched during said lifting of the supporting plate by means of the fabric or the fabrics 21 along the long side walls. During the same lifting movement, the articles 8 being peripherally located will be in contact with the fabrics and not with the fixed walls 10, 11 of the inner wall shell. Thus, by the fact that all fabrics follow the supporting plate 7 in the upwardly directed movement thereof, the articles will not be come in friction contact with the fixed walls. This means, among other things, that the risk for scratching damage on the articles is eliminated. Adjustment of the motors of the driving rolls 20 may be effected in different ways, e.g. by means of photocells which read the level of the contents of the box or by means of weight sensing sensors activating the motors after a given quantity of articles are consumed. The motors of the driving rolls 20 may either be single-acting, i.e. drivable in only one direction of rotation, or be reversibly drivable. By the existence of the hole 19 in the fixed bottom 15, 17 of the box, a free air admission is guaranteed to the space between the bottom and the movable supporting plate 7. Thus, there is no negative pressure or vacuum on the underside of the supporting plate 7 in connection with lifting of the plate.

Instead of lifting the supporting plate upwards from a lower starting position, it is, of course, also conceivable to adjust the supporting plate in an upper starting position and then lower the plate. Such an application is particularly suitable when the box shall receive articles which are spitted out from a manufacturing machine, in particular when the articles are sensible to high heights of fall.

In FIGS. 7 to 13 an embodiment of a box is shown, which may be transported and handled in an easy way, and the volume of which may be reduced in transit and storage.

Figure 9:
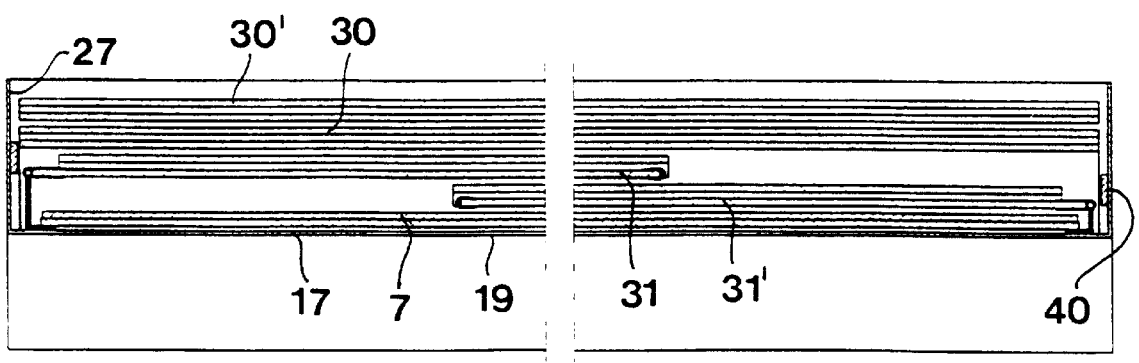
Figure 10:
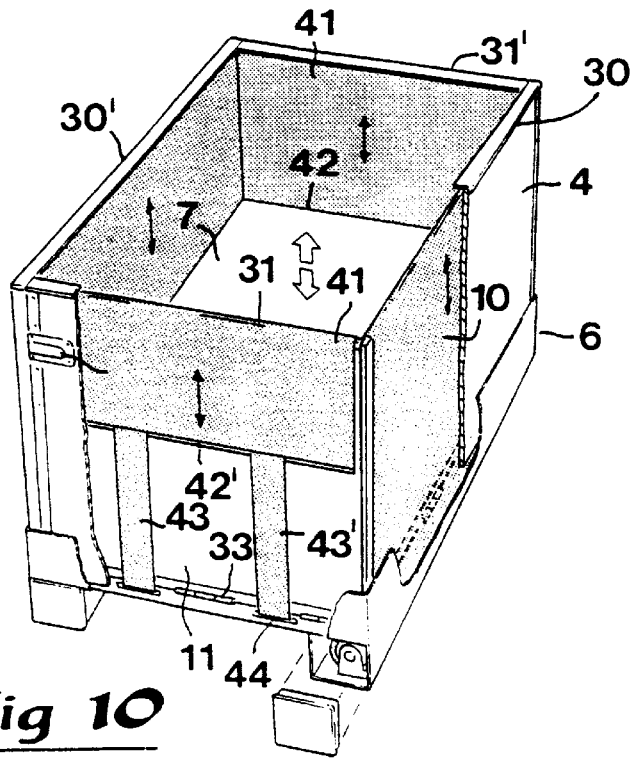
Figure 11:
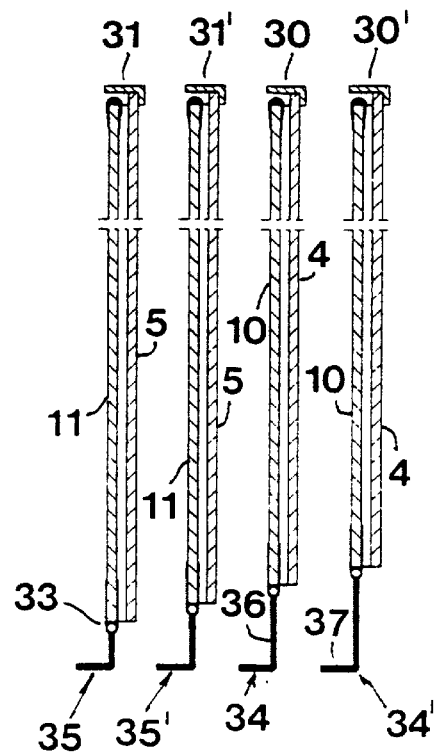

In the embodiment according to FIGS. 7 to 13, the walls of the outer wall shell and the inner wall shell are connected to each other in pairs while forming four separate wall units which in FIG. 10 and 11 are generally designated 30, 30', 31 and 31'. These wall units are lockable relative to each other by locking means 32, each one of which being foldable in relation to the bottom frame 6. In the embodiment shown each individual wall unit 30, 30', 31 and 31' is permanently connected to the bottom frame via a hinge 33 admitting turning of the wall unit between an upright and a lying state. By said hinge, each wall unit is connected to a cross-sectionwise L-shaped profile 34, 34' and 35, 35' respectively with a vertical rib 36 and a horizontal rib 37. As may be clearly seen in FIG. 11, the vertical ribs 36 of the different profiles have different heights, involving that the hinges 33 are located at different levels relative to a horizontal plate 38 (see FIG. 13) included in the bottom frame 6. More precisely, the difference in height between the different vertical ribs is mainly as great as the thickness of the individual wall unit. In this way, it is guaranteed that the different wall units may be folded in and located one above the other in spite of the fact that the upper edges of the wall units are located in a common horizontal plane when the box assumes the open usage position thereof according to FIG. 10. As may be seen in FIG. 7 and 9, the walls are folded back in an order where first one and then the other of the two gable wall units 31 and 31' is turned down to the bottom frame, and then the long side wall units 30 and 30' respectively are folded back over the gable wall units.

The two wall plates 4, 10 and 5, 11 respectively which together form a separate wall unit are in practice stiffly interconnected only along the vertical end edges thereof, more precisely by means of connecting elements which e.g. may consist of cross-section-wise U-shaped sheet profiles (not shown) having punched fixing lugs driven into the plates. This means that the gap 12 between the wall plates is open at the top as well as at the bottom, but closed at the opposite ends of the wall unit by means of the connecting elements. It is also conceivable to use agglutinated or nailed borders between the wall plates to unite the same.

Figure 13:
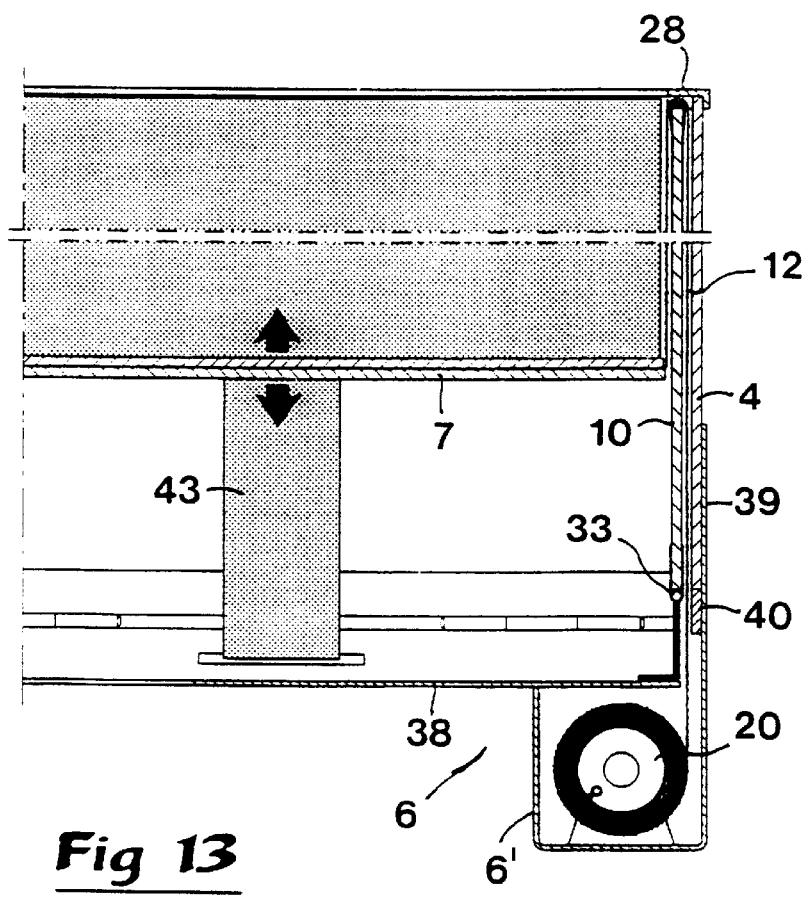
Figure 12:
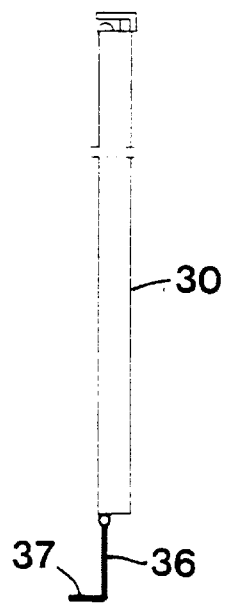

The bottom frame comprises a rectangular collar 39. The long side pieces of said collar consist of prolongations of the outer plates included in the U-profiles which form the supporting elements 6', particular gable plates being arranged between the long side plates. The height of the collar 39 above the bottom plate 38 is at least somewhat greater than the sum of, on one hand, the height of the L-profile 34' having the highest vertical rib, and, on the other hand, the thickness of the wall unit 30'. In this way, it is guaranteed that the upper edge of the collar 39 is located at a somewhat higher level than the hinges 33 of all four wall units. As is indicated in FIG. 9 and 13, there may, on the inside of the collar 39, be arranged a border 40, the purpose of which is to at least contribute to the absorbtion of vertical loads being charged on the upright wall units.

As seen in FIG. 10, the fabrics are not only arranged in connection with the inner walls 10 of the long side wall units, but also in connection with the inner walls 11 of the gable wall units. The last-mentioned fabrics are in FIG. 10 designated 41. These fabrics 41 are not connected to any particular driving mechanism but only arranged to accompany the supporting plate 7 in the vertical movements thereof. For this purpose, the individual fabric 41 has mainly an equally great height as the height of the gable inner wall 11, a first edge 42 of the fabric being attached to the supporting plate 7 and extending upwards from the same, while the opposite, second edge 42' is connected to first ends of at least two mutually separated belts 43, 43' the opposite ends of which are attached to the supporting plate 7 and extending downwards from the same. These belts 43, 43' are drawn and run under the appurtenant lower edge of the inner wall. More precisely, the belts are drawn through slits 44 in the L-profile 35, 35' included in each gable wall unit respectively. As is indicated by means of double arrows in FIG. 6, the fabrics 41 will thus servilely follow the supporting plate whether the same moves upwards or downwards.

Figure 7:
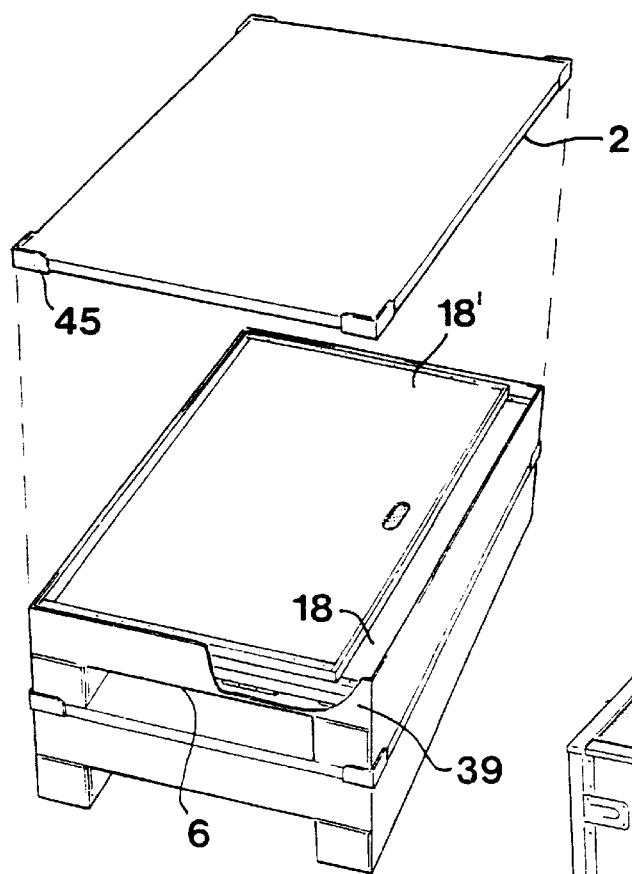
Figure 8:
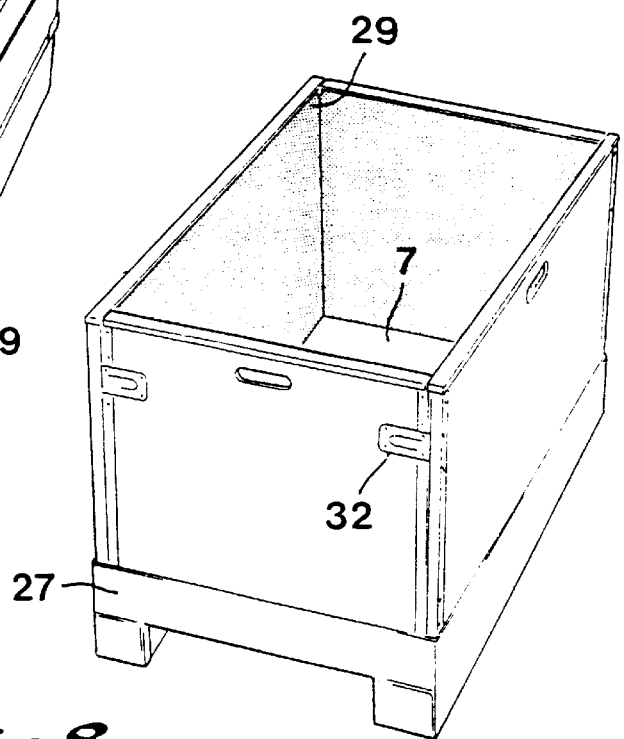

As is seen in FIG. 7, the covering lid is provided with four angular angle hinges 45 which admit that the position finding of the lid is decided not only relative to the open walls of the box but also in relation to the rectangular collar 39. Thus, one and the same lid may be used to cover the contents 8 of the ready-mounted box as well as the wall units which in an inactive state are folded back in the space delimited by the collar 39. By the fact that the angle hinges do not only protrude from the underside of the lid but also a bit away from the top side of the lid, it is furthermore guaranteed that several folded boxes may be piled on each other and be reliably held in relation to each other by lids in the piled state.

Figure 14:
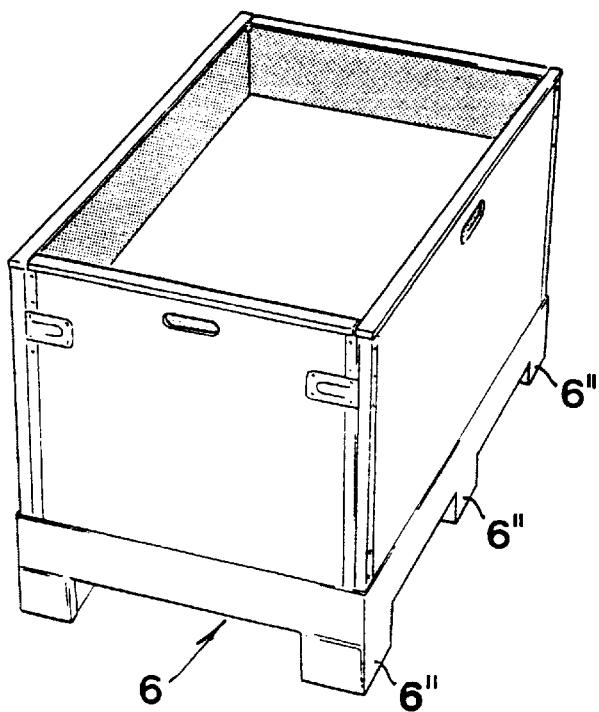
Figure 15:
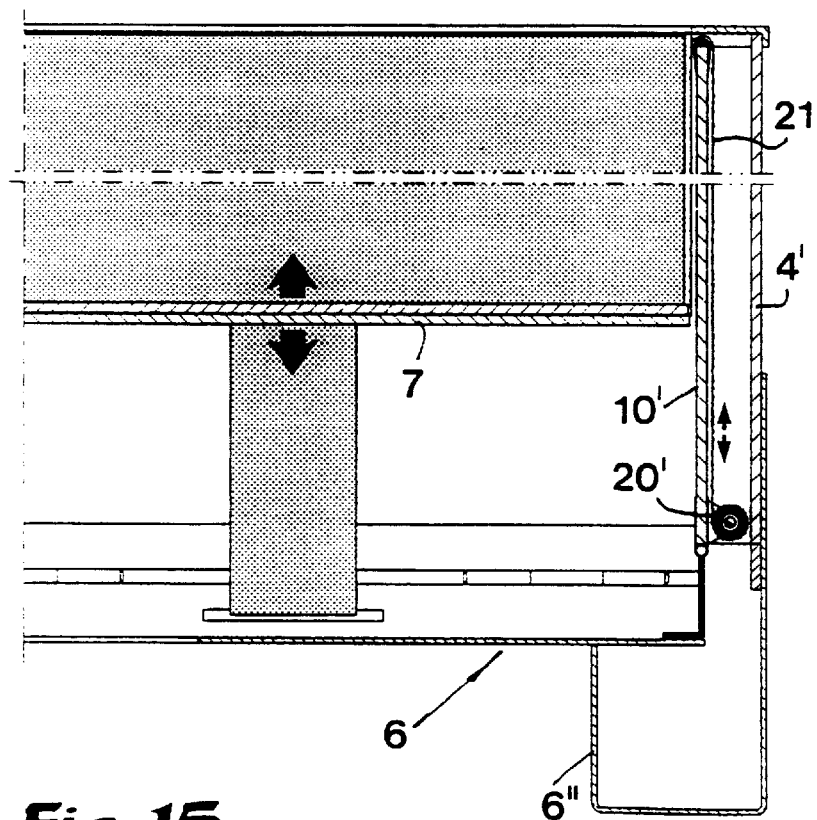

In FIG. 14 and 15 an alternative, third embodiment is shown according to which an extremely thin driving roll 20' is mounted between the outer wall 4' and the inner wall 10' in a long side wall unit. This means that the driving roll 20' for the fabric 21 is located at a level above the U-profile which in the embodiment according to FIGS. 7 to 13 extends the whole way along one long side of the bottom frame. Therefore, in the embodiment according to FIG. 14 an 15, the bottom frame 6 may be made with three different supporting devices 6" between which there are spaces into which fork arms may be inserted from the long side.

THE ADVANTAGES OF THE INVENTION

An advantage of the box structure according to the invention is that the box may be used for storing large quantities of goods having a considerable weight and in spite of this allow an easy and smooth lifting of the goods-supporting plate so that the upper level of the contents of the box may be kept in the vicinity of the top opening of the box for the ultimate purpose of making the contents of the box easily accessible. Another advantage is that the articles in the box do not run the risk of rubbing against or otherwise moving relative to the stationary walls of the box in connection with the lifting of the supporting plate. A further advantage is that the fabrics, by their inherent property of being thin and at the same time strong, occupy an extremely small space along with the inner wall shell, whereby the box volume determined by the outer wall shell can be effectively utilized in spite of the possibility of raising and lowering the supporting plate. A practically valuable advantage is also that the exterior appearance of the box does not substantially differentiate from the appearance of conventional pallet boxes.

FEASIBLE MODIFICATIONS OF THE INVENTION

The invention is not solely restricted to the embodiments described and shown in the drawings. Thus, other supporting components in the inner wall shell may be used instead of whole, unbroken walls. The only important thing is that the inner wall shell has upper edges which are able to support the fabrics during loading thereof. It is also feasible to design the two wall shells with another shape than a parallelepipedic one and with another number of walls than four. It is furthermore conceivable to use other driving mechanisms than motor equipped rolls for stretching the lifting fabrics. Thus, in simpler embodiments it is feasible to use manually rotatable rolls. It may also be pointed out that the edges of the fabrics located in the corners of the box may be made so that they overlap and cover each other. It is e.g. conceivable to sew on a pleated band on one of the two edge portions of fabric which meet in a corner which band covers the other edge portion of fabric. It is also feasible to make the box with wall units which are detachably connected to the bottom frame instead of being permanently connected via hinges thereto.

I claim:

1. Box for storing and simultaneously exposing small goods, comprising a wall shell (3) which opens upwards in a top opening (29) and is composed of a number of upright walls (4, 5) extending upwards from a bottom frame (6), and a goods-supporting plate (7) being vertically adjustable between upper and lower end positions relative to the wall shell, characterized in that there is a second, inner wall shell (9) arranged at a distance inside said wall shell (3), which wall shell (9) is composed of a corresponding number of individual walls (10, 11) presenting upper, supporting edge portions (14) located in the area of the top opening (29) of the outer wall shell (3), and that at least two fabrics (21) are arranged for lifting and level-keeping of the supporting plate (7), each of which fabric being laid over an upper edge portion (14) on an inner wall (10) and has a first part (21') extending between said edge portion (14) and the supporting plate (7) as well as a second part (21") extending between the edge portion (14) and a driving mechanism (20) in relation to which the fabric may be fed in and out respectively.

2. Box according to claim 1, characterized in that the fabric (21) has a width which is mainly as great as the length of the edge portion (14) of the inner wall (10) as well as the length of an edge portion on the supporting plate (7) to which the fabric is connected.

3. Box according to claim 1 or 2, characterized in that the driving mechanism consists of a rotatably mounted roll (20) which is drivable by at least one motor.

4. Box according to any one of the preceding claims, characterized in that the outer wall shell (3) as well as the inner wall shell (9) has a parallelepipedic, basic shape and comprises two pairs of opposite, mutually parallel walls (4, 5; 10, 11).

5. Box according to claim 4, characterized in that fabrics (21, 24, 24') are connected to each one of the four edge portions of the supporting plate (7) and laid over each one of the four inner walls (4, 5; 10, 11).

6. Box according to claim 5, characterized in that the supporting plate is composed of two part plates (7', 7") which are interconnected by means of screws and that the fabric (21, 24, 24') is connected to the supporting plate by being squeezed in between the part plates.

7. Box according to any one of the preceding claims, characterized in that the walls (4, 5; 10, 11) of the outer wall shell (3) and the inner wall shell (9) are connected in pairs while forming separate wall units (30, 30'; 31, 31'), which are lockable relative to each other and each one being foldable in relation to the bottom frame (6).

8. Box according to claim 7 characterized in that the individual wall unit is permanently connected to the bottom frame (6) through a hinge (33) admitting turning of the wall unit between an upright and a lying state.

9. Box according to claim 8, characterized in that the hinges (33) for the different wall units (30, 30'; 31, 31') are situated at different levels so as to admit folding of the wall units to lying positions in which one is at least partially situated above the other one.

10. Box according to claim 9, characterized in that each individual wall unit is, through the appurtenant hinge, connected to a cross-section-wise L-shaped profile (34, 34'; 35, 35') having a vertical rib (36) and a horizontal rib (37) which is fastened on the bottom frame, more precisely at one and the same level, the vertical ribs having different heights so as to locate the hinges (33) at different levels.

* * * * *